United States Patent
Kamhi et al.

(10) Patent No.: US 9,697,867 B2
(45) Date of Patent: Jul. 4, 2017

(54) INTERACTIVE ADAPTIVE NARRATIVE PRESENTATION

(71) Applicant: Intel Corporation, Santa Clara, CA (US)

(72) Inventors: Gila Kamhi, Zichron Yaakov (IL); Nadav Zamir, Raanana (IL); Kobi Nistel, Haifa (IL); Ron Ferens, Ramat Hasharon (IL); Amit Moran, Tel Aviv (IL); Barak Hurwitz, Kibbutz Alonim (IL); Vladimir Kouperman, Haifa (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/866,454

(22) Filed: Sep. 25, 2015

(65) Prior Publication Data

US 2017/0092322 A1    Mar. 30, 2017

(51) Int. Cl.
| | |
|---|---|
| *H04N 13/02* | (2006.01) |
| *G11B 27/029* | (2006.01) |
| *G11B 27/028* | (2006.01) |
| *H04N 9/04* | (2006.01) |
| *G06K 9/00* | (2006.01) |

(52) U.S. Cl.
CPC ........ *G11B 27/029* (2013.01); *G06K 9/00201* (2013.01); *G11B 27/028* (2013.01); *H04N 9/045* (2013.01); *H04N 13/0203* (2013.01)

(58) Field of Classification Search
CPC  G11B 27/029; G11B 27/028; G06K 9/00201; H04N 13/0203; H04N 9/045
See application file for complete search history.

(56) References Cited

U.S. PATENT DOCUMENTS

| | | | | |
|---|---|---|---|---|
| 8,405,717 | B2* | 3/2013 | Kim | H04N 5/222 348/135 |
| 9,256,778 | B2* | 2/2016 | Wooley | G06F 3/011 |
| 9,472,119 | B2* | 10/2016 | Selvaraj | G09B 5/02 |
| 9,486,703 | B2* | 11/2016 | Rofougaran | A63F 13/12 |
| 2003/0185434 | A1* | 10/2003 | Lee | G06F 3/012 382/154 |
| 2004/0174431 | A1 | 9/2004 | Stienstra | |

(Continued)

FOREIGN PATENT DOCUMENTS

| | | |
|---|---|---|
| JP | 2009-212980 A | 9/2009 |
| KR | 10-2005-0021392 A | 3/2005 |
| KR | 10-2006-0060772 A | 6/2006 |

OTHER PUBLICATIONS

International Search Report and Written Opinion issued in PCT Application No. PCT/US2016/046143, dated Nov. 21, 2016.

*Primary Examiner* — Hung Lam
(74) *Attorney, Agent, or Firm* — Grossman, Tucker, Perreault & Pfleger, PLLC

(57) ABSTRACT

A narrative presentation system may include at least one optical sensor capable of detecting objects added to the field-of-view of the at least one optical sensor. Using data contained in signals received from the at least one optical sensor, an adaptive narrative presentation circuit identifies an object added to the field-of-view and identifies an aspect of a narrative presentation logically associated with the identified object. The adaptive narrative presentation circuit modifies the aspect of the narrative presentation identified as logically associated with the identified object.

25 Claims, 5 Drawing Sheets

(56) References Cited

U.S. PATENT DOCUMENTS

2004/0267816 A1   12/2004  Russek
2016/0188557 A1*  6/2016  Spanu ................ G06F 3/04842
                                                            715/230

* cited by examiner

INTERACTIVE ADAPTIVE NARRATIVE PRESENTATION

TECHNICAL FIELD

The present disclosure relates to the interactive delivery of narrative presentations.

BACKGROUND

Storytelling is an art form that has existing since man first mastered the principles of communication. Good storytelling involves a combination of elements, including personalization, dramatization, and emotionally attractive content. Throughout time, technological innovation has permitted storytelling to advance from simple oral and written communication before limited audiences to complex audio/visual presentations posted online and available on demand to a potentially immense audience. In addition, the interactive nature of the Internet provides media consumers with the unprecedented ability to interact with the storyteller.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
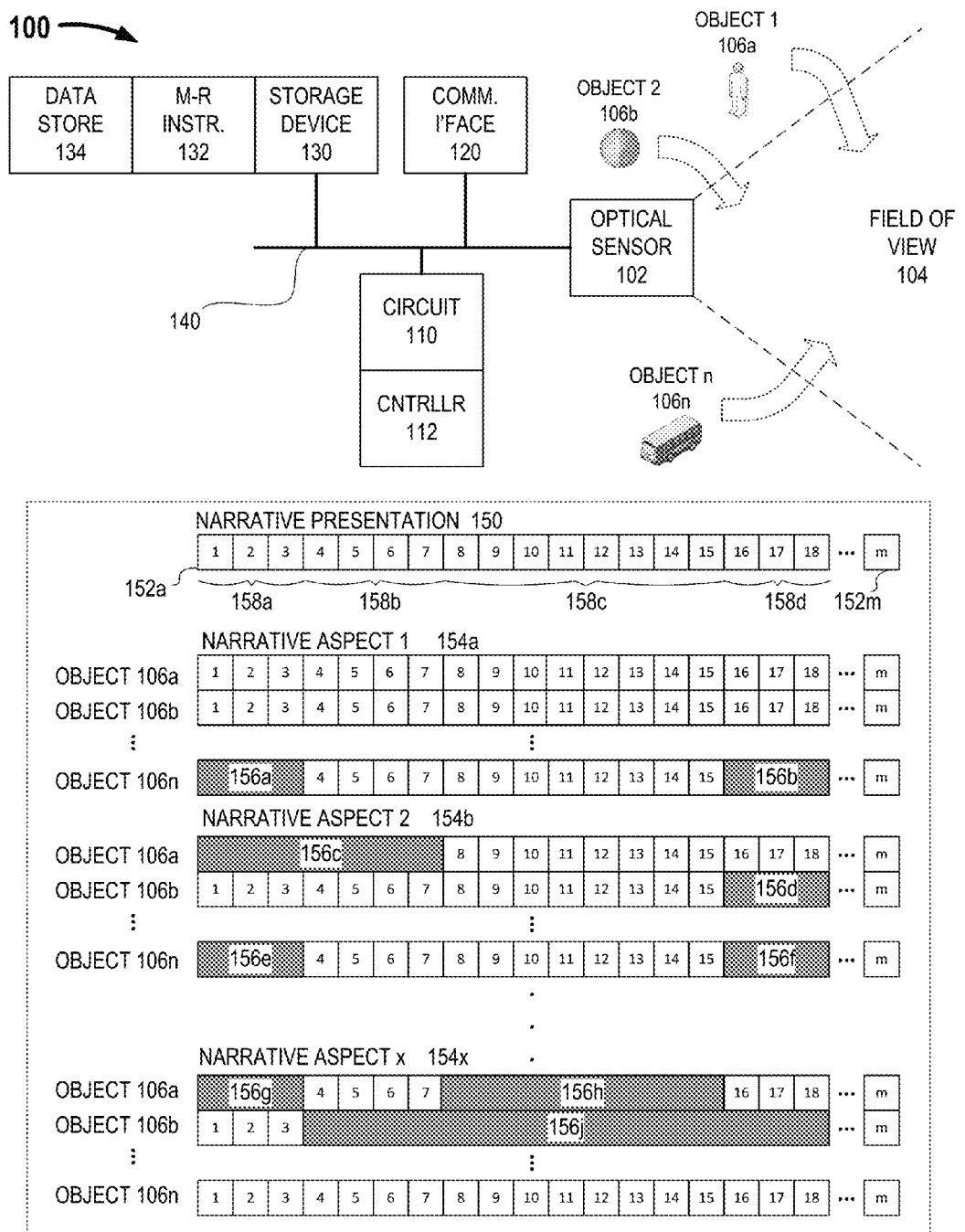
FIG. 1 is a schematic diagram of an illustrative adaptive narrative presentation system, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

Many modern computer systems are equipped with audio and visual output devices that enable the delivery of relatively sophisticated audio/visual media content. Many modern computer system are also equipped with one or more input devices such as keyboards, microphones, touch-screens, and optical sensors that enable a user to interact with the computer in a number of ways. With ongoing reductions in storage costs and increasing processor speeds, object detection, recognition, and identification technologies are also finding their way to consumer level systems and video games.

These media and digital technologies make possible many non-traditional storytelling forms, such as the presentation of non-linear and interactive narratives. In an interactive narrative, the media consumer has the capability to alter the narrative. When combined with the capabilities of modern processor-based devices, it becomes possible for a media consumer to alter the narrative presentation simply by providing input in the form of an object placed in the field-of-view 104 of an optical sensor communicably coupled to the system. When the object is added to the field-of-view of the optical sensor, the system identifies the object and alters one or more aspects of the narrative presentation based on the object.

For example, placing an object such as a plastic cow figure in the field-of-view of the at least one optical sensor may cause an adaptive narration presentation controller to first, identify the figure as a "cow." Next, the adaptive narration presentation controller 112 may identify those aspects logically associated with a "cow"—example aspects include the storytelling perspective and the setting of the narrative presentation. In one instance, the setting logically associated with a "cow" may be a "rural" or "farm" setting. In response to identifying the cow, the adaptive narration presentation controller may change the setting of the narrative presentation from an urban setting to a rural setting. In another instance, the perspective of the narrative presentation may shift to the perspective of a cow appearing in the narrative presentation.

An adaptive narrative presentation system is provided. The adaptive narrative presentation system may include at least one optical sensor having a field-of-view and a communications interface. The adaptive narrative presentation system may additionally include a circuit communicably coupled to the at least one optical sensor and the communications interface. The adaptive narrative presentation system may also include a storage device communicably coupled to the circuit, the storage device including machine-readable instructions that, when executed, cause the circuit to provide an adaptive narration presentation controller that: generates a narrative presentation output at the communications interface; concurrent with the narrative presentation, optically identifies an object added to the field-of-view of the at least one optical sensor, the optical identification based at least in part on at least one intrinsic parameter of the object; identifies at least one aspect of the narrative presentation logically associated with the identified object; and modifies the at least one aspect of the narrative presentation based at least in part on the identified object.

An adaptive narrative presentation method is provided. The method may include generating, by an adaptive narration presentation controller, a narrative presentation output at a communicably coupled communications interface. The method may further include receiving, by the adaptive narration presentation controller, a signal containing data indicative of an object placed in a field-of-view of at least one optical sensor communicably coupled to the adaptive narrative presentation system. The method may also include concurrent with the narrative presentation, optically identifying, by the adaptive narration presentation controller, the object based at least in part on at least one intrinsic characteristic of the object. The method may additionally include autonomously identifying, by the adaptive narration presentation controller, at least one aspect of the narrative presentation logically associated with the identified object; and modifying, by the adaptive narration presentation controller, the at least one aspect of the narrative presentation based at least in part on the identified object.

Another adaptive narrative presentation system is provided. The system may include a means for generating a narrative presentation output at a communicably coupled communications interface. The system may further include a means for receiving a signal containing data indicative of an object placed in a field-of-view of a communicably coupled optical sensor. The system may additionally include a means for optically identifying concurrent with the narrative presentation the object based at least in part on at least one intrinsic parameter of the object. The system may additionally include a means for autonomously identifying at least one aspect of the narrative presentation logically associated with the identified object; and a means for modifying the at least one aspect of the narrative presentation based at least in part on the identified object.

A storage device that includes machine-readable instructions that, when executed, cause a circuit to provide an adaptive narrative presentation controller is provided. The machine-readable instructions cause a circuit to provide an adaptive narrative presentation controller by causing the circuit to generate a narrative presentation output at a communicably coupled communications interface. The instructions further cause the circuit to receive a signal containing data indicative of an object placed in a field-of-view of at least one communicably coupled optical sensor. The instructions further cause the circuit to, concurrent with the generation of the narrative presentation, optically identify the object based at least in part on at least one intrinsic characteristic of the object, autonomously identify at least one aspect of the narrative presentation logically associated with the identified object, and modify the at least one aspect of the narrative presentation based at least in part on the identified object.

FIG. 1 is a schematic of an illustrative adaptive narrative presentation system 100, in accordance with at least one embodiment of the present disclosure. The adaptive narrative presentation system 100 includes at least one optical sensor 102 having a defined field-of-view 104. A number of objects 106a-106n (collectively "objects 106") may be placed in or removed from the field-of-view 104 of the at least one optical sensor 102. The adaptive narrative presentation system 100 also includes one or more circuits 110, one or more communications interfaces 120, one or more storage devices 130, and one or more buses 140 that communicably couple or interconnect the at least one optical sensor 102, the at least one circuit 110, the at least one communications interface 120, and the at least one storage device 130.

The at least one storage device 130 may include one or more sets of machine-readable instructions 132, and one or more data stores 134. In embodiments, the one or more sets of machine-readable instructions 132 may be executable in whole or in part by the at least one circuit 110. When executed by the at least one circuit 110, the machine-readable instructions may cause the at least one circuit 110 to provide a particular and specialized machine in the form of an adaptive narrative presentation circuit 112.

The adaptive narration presentation circuit 112 generates an output that includes a narrative presentation 150 that includes a number of narrative segments 158a-158d (collectively "narrative segments 158") each composed of a number of frames 152a-152m (collectively "frames 152").

The adaptive narrative presentation circuit 112 may provide the output containing the narrative presentation 150 to the communications interface 120. Although not depicted in FIG. 1, one or more output devices such as a display device, speaker, or combinations thereof, may be communicably coupled to the communications interface 120. The narrative presentation 150 may include a media presentation in any format (e.g., audio, visual, audio/visual) and having any length or duration. The narrative presentation 150 may include, but is not limited to, any serially presented media sequence such as a story, movie, show, demonstration, song, or combinations thereof. The narrative presentation 150 may include one or more aspects 154a-154x (collectively "aspects 154") that define or characterize the narrative presentation. Example aspects include, but are not limited to, a location where at least a portion of the narrative presentation occurs, a time period during which at least a portion of the narrative presentation occurs, a weather condition during which at least a portion of the narrative presentation occurs, a social condition during which at least a portion of the narrative presentation occurs, or a mood during at least a portion of the narrative presentation.

The at least one optical sensor 102 can include any sensor capable of receiving electromagnetic energy in at least a portion of the visible electromagnetic spectrum (electromagnetic energy having a wavelength of from about 390 nm to about 700 nm), the infrared electromagnetic spectrum (electromagnetic energy having a wavelength of from about 700 nm to about 15,000 nm), the ultraviolet magnetic spectrum (electromagnetic energy having a wavelength of from about 10 nm to about 390 nm), or any combination thereof. The at least one optical sensor 102 may include a single optical sensor or an optical sensor array containing a plurality of individual optical sensors. In some implementations, the at least one optical sensor 102 may include a plurality of optical sensors with shifted parallax to provide stereoscopic or three-dimensional optical sensing capabilities. In some implementations, the at least one optical sensor 102 may include at least one visible wavelength optical sensor and at least one near-infrared (electromagnetic energy having a wavelength of from about 700 nm to about 1450 nm) optical sensor or at least one near-ultraviolet (electromagnetic energy having a wavelength of from about 300 nm to about 400 nm) optical sensor. The at least one optical sensor 102 may provide one or more output signals, each of the output signals including data representative of the scene visible within all or a portion of the field-of-view 104 of the at least one optical sensor 102. The at least one optical sensor 102 may include one or more solid-state optical imaging electronic devices. Examples of such solid-state optical imaging electronic devices include, but are not limited to, charge coupled devices (CCDs), complementary metal-oxide semiconductors (CMOS), and N-type metal oxide semiconductors (NMOS).

The at least one optical sensor 102 acquires an image of a scene containing objects 106 appearing with field-of-view 104 of the at least one optical sensor 102. The objects 106 appearing in the field-of-view 104 may include static objects such as walls, windows, and furniture that appear in the field-of-view 104 of the at least one optical sensor 102 at the outset of the narrative presentation 150 and remain in relatively the same location within the field-of-view 104 of the at least one optical sensor 102 for the duration of the narrative presentation 150. The objects 106 appearing in the field-of-view 104 may include dynamic objects that may be added to or removed from the field-of-view 104 of the at least one optical sensor 102 at some point during the narrative presentation 150. In some implementations, the objects 106 may include objects 106 that are added to or removed from the field-of-view 104 of the at least one optical sensor 102 by a narrative presentation consumer.

In some particular embodiments, at least some of the objects 106 may be related to or logically associated with one or more aspects 154 of the narrative presentation 150. For example, if a child is watching an audio/visual narrative presentation 150 that includes a number of "superhero" characters, the child may, during the narrative presentation 150, place objects representative of a particular "superhero" or representative of a particular "villain" in the field-of-view 104 of the at least one optical sensor 102. Where the adaptive narrative presentation circuit 112 identifies the object 106 as related to or logically associated with one or more aspects of the narrative presentation 150, the adaptive narrative presentation circuit 112 may alter or adjust the respective aspect of the narrative presentation for all or a part of the duration that the object remains within the field-of-view 104 of the at least one optical sensor 102.

For example, if a time of day aspect of the narrative presentation 150 is set during daylight hours and an object 106b in the shape of a moon is placed in the field-of-view 104 of the at least one optical sensor 102, the time of day aspect of the narrative presentation 150 may shift from daylight to evening while the remaining aspects 154 of the narrative presentation remains unchanged. In embodiments, upon identifying one or more objects 106 added to the field-of-view 104 of the at least one optical sensor 102, the adaptive narrative presentation circuit 112 may alter, change, or adjust one or more aspects of the narrative presentation 150 provided at the at least one communications interface 120. In embodiments, upon identifying one or more objects 106 removed from the field-of-view 104 of the at least one optical sensor 102, the adaptive narrative presentation circuit 112 may alter, change, or adjust one or more aspects of the narrative presentation 150 provided at the at least one communications interface 120.

In some embodiments, the adaptive narrative presentation circuit 112 may alter, adjust, or change the narrative presentation 150 based at least in part on the location of an object 106 added to the field-of-view 104 of the at least one optical sensor 102. For example, if an object 106b is added to the field-of-view 104 proximate an existing identified object 106a, then the adaptive narrative presentation circuit 112 may alter a portion of the narrative presentation that includes information regarding the relationship between the two objects 106a, 106b. For example, if a three-dimensional figure object 106b identified by the adaptive narrative presentation circuit 112 as a "child" is added to the field-of-view 104 proximate a three dimensional figure object 106a previously identified as a "woman," the adaptive narrative presentation circuit 112 may adapt the narrative presentation 150 to include information about a mother/child relationship.

In some embodiments, the adaptive narrative presentation circuit 112 may alter, adjust, or change the narrative presentation 150 based at least in part on the depth of an object 106 added to the field-of-view 104 of the at least one optical sensor 102. For example, if an the distance to the object 106 added to the field-of-view 104 may correspond to a temporal axis such that an object 106 (e.g., identified by the adaptive narrative presentation circuit 112 as "Abraham Lincoln") is placed near the at least one optical sensor 102 may indicate a more recent timeframe (e.g., Lincoln as President) while the same object 106 placed at a distance from the at least one optical sensor 102 may represent a more historic timeframe (e.g., Lincoln as a child).

Each of at least some of the objects 106 may be logically associated with a number of aspects 154 of one or more narrative presentations 150. For example, an object 106b representative of the moon may be logically associated with an aspect such as the time of day of all or a portion of one or more narrative presentations 150. When such an object 106 is placed in the field-of-view 104 of the at least one optical sensor 102, the adaptive narrative presentation circuit 112 visually identifies the respective object 106, identifies the one or more aspects 154 logically associated with the respective object 106, and determines whether the one or more identified aspects 154 in the current narrative presentation 150 may be altered, adjusted, or changed in a manner that is related or corresponds to the respective object 106. If such a change in the narrative presentation is permissible, the adaptive narrative presentation circuit 112 alters, adjusts, or changes the one or more aspects of the narrative presentation 150 based on the one or more aspects logically associated with the respective object 106.

In some instances, an object 106 may be placed in the field-of-view 104 of the at least one optical sensor 102 during a narrative segment 158 that is critical for plot development in the narrative presentation 150. Such periods may be referred to as "blackout" narrative segments 156a-156j (collectively "blackout narrative segments 156") where the addition of a particular object 106 in the field-of-view 104 of the at least one optical sensor 102 does not cause the adaptive narrative presentation circuit 112 to change, alter, or adjust the narrative presentation 150. For example, "blackout" narrative segment 156a is logically associated with object 106n and appears in narrative aspect 154a during narrative segment 158a (i.e., frames 1-3). Similarly, "blackout" narrative segment 156e is logically associated with object 106n and appears in narrative aspect 154b during narrative segment 158a. If object 106n is added to the field-of-view 104 of the at least one optical sensor 102 during the first narrative segment 158a, the adaptive narrative presentation circuit 112 does not alter either of narrative aspect 154a or narrative aspect 154b. However, since no such blackout window 156 exists for object 106n in for narrative aspect 156x during narrative segment 158a, the adaptive narrative presentation circuit 112 may alter narrative aspect 154x if object 106n is placed in the field-of-view 104 of the at least one optical sensor 102 during the first narrative segment 158a.

The communications interface 120 may include one or more wired or wireless interfaces capable of communicating output data from the adaptive narrative presentation circuit 112 to one or more external devices. In embodiments, various output devices may be communicably coupled to the at least one communications interface 120. For example, one or more audio output devices (e.g., speakers, headphones), one or more video output devices (e.g., monitor), one or more audio/visual output devices, or combinations thereof may be communicably coupled to the at least one communications interface 120. In some implementations, the communications interface 120 may include one or more wired or wireless network connections across which all or a portion of the narrative presentation 150 may be received.

The at least one storage device 130 may include any number, type, or combination of types and numbers of systems or devices capable of storing digital data. Non-limiting illustrative examples include, but are not limited to: magnetic data storage media, optical data storage media, solid state storage media, electroresistive storage media, quantum storage media, molecular storage media, or combinations thereof. The at least one storage device 130 may include one or more sets of machine-readable instructions 132 that, when executed, cause the circuit 110 to provide the particular and specialized adaptive narrative presentation circuit 112. The at least one storage device 130 may additionally include one or more sets of machine-readable instructions 132 that cause the circuit 110 to provide optical object detection, recognition, and/or identification for at least a portion of the objects 106 placed in the field-of-view 104 of the at least one image sensor 102.

The at least one storage device 130 may additionally include one or more data stores 134. In some implementations, the one or more data stores 134 may include data representative of one or more narrative presentations 150.

In some implementations, the one or more data stores 134 may include any number of databases, relational databases, or similar data storage structures to retain and/or organize data representative of defined characteristics logically associated with any number of objects 106. The adaptive narrative presentation circuit 112 may use such databases, relational databases, or similar data storage structures to detect, recognize, and/or identify at least some of the objects 106 positioned in the field-of-view 104 of the at least one optical sensor 102 based on the intrinsic characteristics of the respective object 106 rather than based on an explicit code, identifier, tag, or electronic marker that is not an intrinsic characteristic of the respective object 106 but is instead carried by or otherwise affixed to the respective object 106

In some implementations, the one or more data stores 134 may include any number of databases, relational databases, or similar data storage structures to retain and/or organize data representative of defined aspects 154 logically associated with each respective one of a number of objects 106. The adaptive narrative presentation circuit 112 may use such databases, relational databases, or similar data storage structures to identify narrative aspects 154 that can be altered, adjusted, and/or changed when the respective object 106 is placed in the field-of-view 104 of the at least one optical sensor 102.

In some implementations, the one or more data stores 134 may include any number of databases, relational databases, or similar data storage structures to retain and/or organize data representative of defined aspects 154 and/or "blackout" narrative segments 156 logically associated with such aspects for each of a number of narrative presentations 150. The adaptive narrative presentation circuit 112 may use such databases, relational databases, or similar data storage structures to identify those narrative aspects 154 that can be altered, adjusted, or changed when the respective object 106 is placed in the field-of-view 104 of the at least one optical sensor 102.

At least one communications bus 140 communicably couples the at least one circuit 110, the at least one communications interface 120, the at least one storage device 130, and the at least one optical sensor 102.

Figure 2:
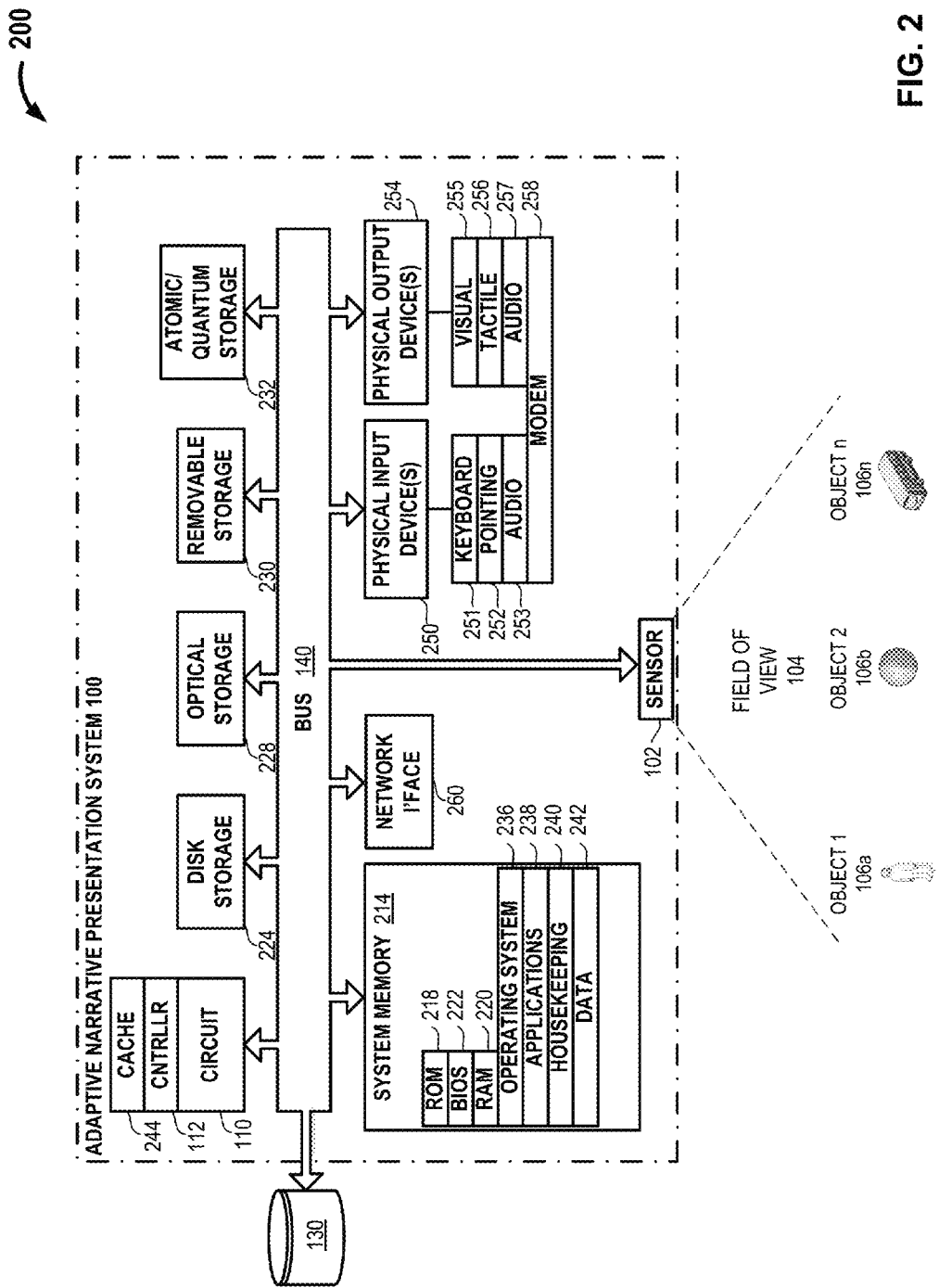
FIG. 2 is a schematic diagram of an illustrative adaptive narrative presentation system, in accordance with at least one embodiment of the present disclosure.

FIG. 2 depicts an illustrative system 200 capable of providing an adaptive narrative presentation system 100 such as the example system depicted in FIG. 1, in accordance with at least one embodiment of the present disclosure.

The system 200 may include one or more circuits 110, that upon execution of one or more machine-readable instruction sets 132, transform into one or more particular machines, such as the adaptive narrative presentation system 100 described in FIG. 1. The execution of such instructions may cause a selective, configurable coupling of various electrical components (resistors, capacitors, inductors, etc.) and semiconductor devices (transistors, diodes, etc.) in the circuit 110 such that at least a portion of the circuit 110 provides the adaptive narrative presentation circuit 112.

The bus 140 couples a system memory 214 and other system components to the circuit 110 and hence, to the adaptive narrative presentation circuit 112. In embodiments, the adaptive narrative presentation circuit 112 may include any number or combination of processing units, such as one or more single- or multi-core microprocessors, one or more controllers, one or more digital signal processors, one or more application-specific integrated circuits (ASICs), one or more systems on a chip (SoCs), one or more reduced instruction set computers (RISCs); one or more field programmable gate arrays (FPGAs), etc. In embodiments, the adaptive narrative presentation circuit 112 may include one or more digital signal processors (DSPs). In embodiments, the adaptive narrative presentation circuit 112 may include a hard wired control circuit. In some embodiments, the adaptive narrative presentation circuit 112 may include a programmable processor capable of executing one or more machine-readable instruction sets.

The bus 140 can employ any known bus structures or architectures, including a memory bus with memory controller, a peripheral bus, and/or a local bus. The system memory 214 includes read-only memory ("ROM") 218 and random access memory ("RAM") 220. In at least some implementations, the RAM 220 may include some or all of the data and/or machine-readable instruction sets executed by the adaptive narrative presentation circuit 112 to identify objects 106 and identify aspects 154 of the narrative presentation 150 logically associated with each identified object. A basic input/output system ("BIOS") 222, which can form part of the ROM 218, contains basic routines that facilitate machine level operation of the adaptive narrative presentation system 100, such as communications and I/O handling.

The system 200 may include one or more disk storage devices 224, one or more optical storage devices 228, one or more removable storage devices 230, one or more atomic or quantum storage devices 232, or combinations thereof. The one or more disk storage devices 224, one or more optical storage devices 228, one or more removable storage devices 230, one or more atomic or quantum storage devices 232 may communicate with the circuit 212 via the bus 140. The one or more disk storage devices 224, one or more optical storage devices 228, one or more removable storage devices 230, one or more atomic or quantum storage devices 232 may include interfaces or controllers (not shown) to communicably couple the respective storage device to the bus 140, as is known by those skilled in the relevant art. The storage devices 224, 228, 230, and 232 may provide nonvolatile storage of computer-readable instructions, data structures, program modules and other data generated, created, and/or used by the system 200.

Machine-readable instructions may be stored in the system memory 214. Such machine-readable instruction sets may include, but are not limited to, an operating system 236, one or more application programs 238, housekeeping programs 240 and program data 242. In at least some implementations, the adaptive narrative presentation circuit 112 may cause machine-readable instructions to transfer or otherwise "load" from the storage device 130 to the system memory 214 for execution.

In implementations, the machine-readable instructions 132 that transform all or a portion of the circuit 110 into the adaptive narrative presentation circuit 112 may be retained in whole or in part into the system memory 214. Program data including a number of machine-readable instructions in the form of programs or applications 238 may be stored in whole or in part in a cache 244 communicably coupled to the circuit 212, in system memory 214, or any combination thereof.

In embodiments, one or more application programs 238 may include machine-readable instructions that permit the adaptive narrative presentation circuit 112 to detect and identify at least some objects 106 placed in the field-of-view 104 of the at least one optical sensor 102 based on data provided by one or more signals received from the at least one optical sensor 102. Such object detection and identification may be performed by the adaptive narrative presentation circuit 112 at least in part using one or more intrinsic characteristics of the object 106 and not based on a tag or identifier (2D or 3D matrix tag, barcode, RFID tag, etc.) carried by the object 106. Such intrinsic characteristics may include, but are not limited to, the shape of the object 106, the color or colors of the object 106, one or more anatomical features of the object 106, one or more geometric features of the object 106, or combinations thereof. In some implementations, the adaptive narrative presentation circuit 112 may include one or more machine-learning systems that permit a user of the adaptive narrative presentation system 100 to "teach" the adaptive narrative presentation circuit 112 characteristics of new objects 106, thereby allowing the adaptive narrative presentation system 100 to adapt to new environments. In some implementations, a portion of the narrative presentation 150 may include machine-readable instructions that "teach" the adaptive narrative presentation circuit 112 one or more characteristics of new objects 106. Thus, for example, a narrative presentation 150 that includes farm animals may additionally include machine-readable instructions 132 that "teach" the adaptive narrative presentation circuit 112 a number of characteristics that enable the differentiation and identification of objects 106 such as "cows," "horses," "pigs," "goats," "sheep," and "chickens" by the adaptive narrative presentation circuit 112.

In embodiments, one or more application programs 238 may include machine-readable instructions 132 that cause the adaptive narrative presentation circuit 112 to identify one or more aspects 154 logically associated with each identified object 106 placed in the field-of-view 104 of the at least one optical sensor 102. Such machine-readable instructions 132 may cause the adaptive narrative presentation circuit 112 to perform a number of look-ups or similar data acquisition/retrieval operations using one or more data stores 134 contained in whole or in part on the storage device 130, system memory 214, or combinations thereof.

In embodiments, one or more application programs 238 may include machine-readable instructions 132 that cause the adaptive narrative presentation circuit 112 to alter, adjust, or change one or more aspects 154 of a narrative presentation 150 in response to the identification of an object 106 placed in the field-of-view 104 of the at least one optical sensor 102. In some embodiments, a narrative presentation 150 may include one or more "blackout" periods where adjustment, alteration, or changes to the narrative presentation are precluded, such as during critical portions of plot development in the narrative presentation 150. In such instances, the one or more application programs 238 may cause the adaptive narrative presentation circuit 112 to identify such "blackout" portions and alter, adjust, or change one or more aspects 154 or decline to alter, adjust, or change one or more aspects 154 of a narrative presentation 150, accordingly.

While shown in FIG. 2 as being stored in the system memory 214, the operating system 236, application programs 238, other programs/modules 240, program data 242 and browser 244 can be stored in whole or in part on the one or more disk storage devices 224, the one or more optical storage devices 228, the one or more removable storage devices 230, the one or more atomic or quantum storage devices 232 or combinations thereof.

A system user or media consumer may provide input such as commands and/or selections, to the adaptive narrative presentation system 200 using one or more physical input devices 250. Example physical input devices 250 include, but are not limited to, one or more keyboards 251, one or more pointing devices 252 (touchscreen, mouse, trackball, etc.), one or more audio devices 253 (e.g., microphone), or combinations thereof. The physical input devices 250 may communicably couple and may provide input to the adaptive narrative presentation circuit 112 via one or more hardware input/output (I/O) interfaces. Example hardware I/O interfaces can include, but are not limited to, one or more serial interfaces, one or more parallel interfaces, one or more universal serial bus (USB) interfaces, one or more THUNDERBOLT® interfaces, one or more wireless interfaces (e.g., BLUETOOTH®, near field communication, or any similar current or future developed wireless communication technology).

A system user or media consumer may receive or otherwise perceive system output via one or more physical output devices 254. Example physical output devices 254 may include, but are not limited to, one or more visual output devices 255 (monitor, virtual reality headset, etc.), one or more tactile output devices 256, one or more audio output devices 257 (e.g., speaker), or combinations thereof. The physical output devices 254 communicably couple to and receive output from the circuit 212 via one or more hardware input/output (I/O) interfaces. Example hardware I/O interfaces can include, but are not limited to, one or more serial interfaces, one or more parallel interfaces, one or more universal serial bus (USB) interfaces, one or more THUNDERBOLT® interfaces, one or more wireless interfaces (e.g., BLUETOOTH®, near field communication, or any similar current or future developed wireless communication technology). One or more modems or similar communications devices may be communicably coupled to the I/O interface.

The adaptive narrative presentation system 200 may communicably couple via a wired or wireless network interface 260 to one or more remote computers and/or devices. The network interface 260 may include one or more wireless interfaces and may employ any number, type or combination of wired and/or wireless network architecture, for instance wired and wireless local area networks (LANs), wide area networks (WANs), wireless local area networks (WLANs), intranets, extranets, and/or the World Wide Web or Internet. Other embodiments may include other types of communications networks including telecommunications networks, cellular networks, paging networks, and other mobile networks.

Figure 3:
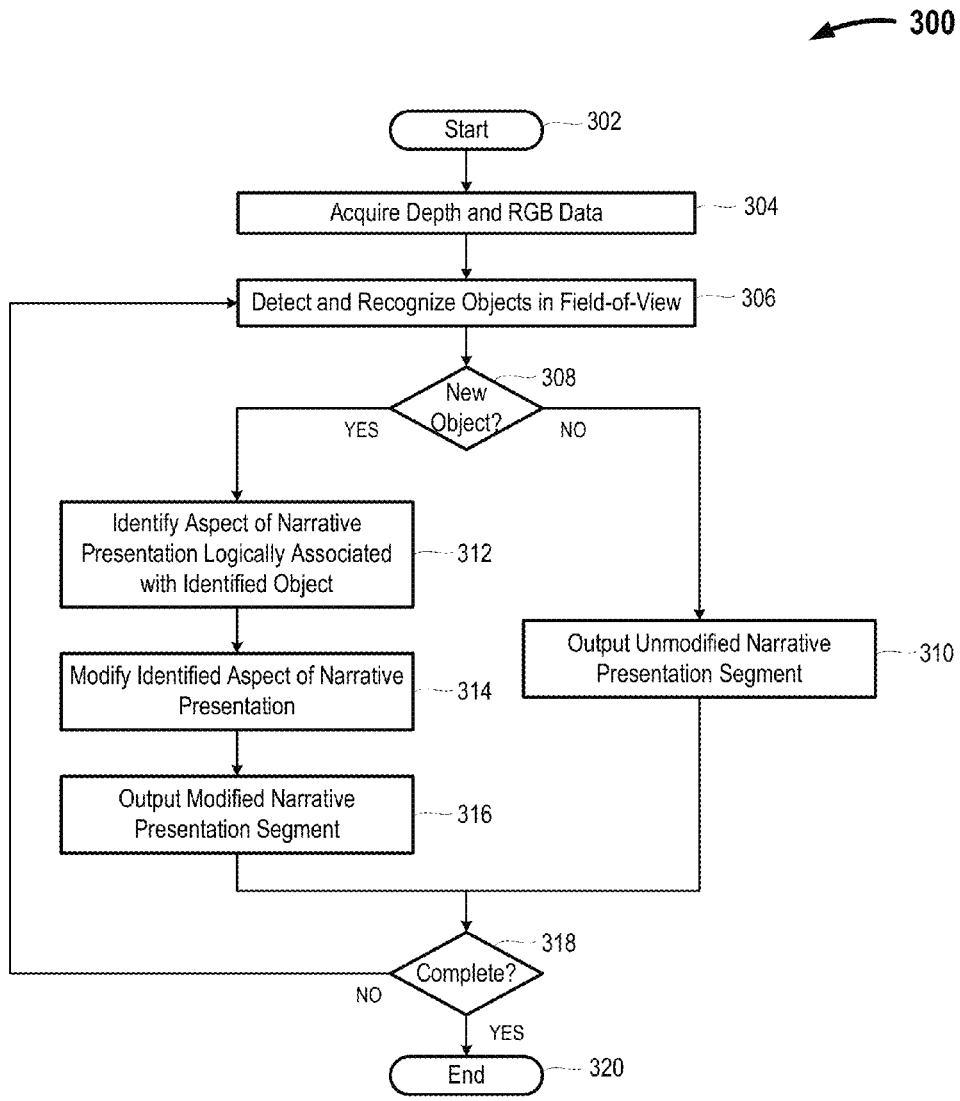
FIG. 3 is a high-level flow diagram of an example method of altering the content of an adaptive narrative presentation in response to detecting the addition of an object to the field-of-view of the system, in accordance with at least one embodiment of the present disclosure.

FIG. 3 is a high-level flow diagram of an illustrative method 300 of changing the content of a narrative presentation 150 responsive to identifying one or more objects placed in the field-of-view 104 of an adaptive narrative presentation system 100, in accordance with one or more embodiments described herein. The adaptive narrative presentation system 100 includes at least one optical sensor 102 that generates an output signal that includes information indicative of objects appearing within the field-of-view 104 of the at least one optical sensor 102. A change in the content of the output signal from the at least one optical sensor 102 may therefore indicate the placement or addition of a new object to the field-of-view 104 of the at least one optical sensor 102. In embodiments, the adaptive narrative presentation circuit 112 may use the data in the output signal from the at least one optical sensor 102 as a basis for identifying an object 106 that is added to the field-of-view 104 of the at least one optical sensor 102. The method 300 commences at 302.

At 304, the adaptive narrative presentation circuit 112 receives at least one signal from the at least one optical sensor 102. In embodiments, the at least one signal includes data representative of an image of the field-of-view 104 of the at least one optical sensor 102 in a visible light spectrum, an infrared spectrum, an ultraviolet spectrum or some combination thereof. In one or more specific embodiments, the signal may include data representative of red, green, and blue (RGB) values across an image of the field-of-view 104 of the at least one optical sensor 102. In some implementations, the at least one optical sensors 102 may generate the RGB values using one or more CCD or CMOS image sensors and one or more Bayer filters positioned between the physical scene and the one or more CCD or CMOS image sensors.

In some implementations, the output signal provided by the at least one optical sensor 102 may include depth or similar three-dimensional data related to the distance between the at least one optical sensor 102 and one or more objects 106 appearing in the field-of-view 104 of the at least one optical sensor 102. In some implementations, a plurality of optical sensors 102 may be used to obtain images of at least a portion of the same field-of-view 104 and parallax data obtained from the two images may be used to determine depth information for one or more objects 106 appearing in the field-of-view 104 of the plurality of optical sensors 102.

At 306, the adaptive narrative presentation circuit 112 detects and attempts to identify one or more objects 106 appearing in the field-of-view 104 of the at least one optical sensor 102.

At 308, the adaptive narrative presentation circuit 112 determines whether any of the objects 106 appearing in the field-of-view 104 of the at least one optical sensor 102 are new. In some implementations, the adaptive narrative presentation circuit 112 may detect the appearance or addition of new objects 106 to the field-of-view 104 of the at least one optical sensor 102 by comparing at least a portion of the signal received from the at least one optical sensor 102 at two different times to detect changes in the data indicative of a new item appearing in the field-of-view 104 of the at least one optical sensor 102.

In some implementations, the adaptive narrative presentation circuit 112 may perform such data comparisons on an ongoing or even continuous basis such that a new object 106 placed in the field-of-view 104 of the at least one optical sensor 102 may be detected by the adaptive narrative presentation circuit 112 almost immediately. In other implementations, the adaptive narrative presentation circuit 112 may perform such temporal comparisons on a periodic temporal basis (e.g., every 2 seconds) such that objects 106 added to the field-of-view 104 of the at least one optical sensor 102 may be detected at the start of the next periodic interval. In other implementations, the adaptive narrative presentation circuit 112 may perform such signal data comparisons at the start of each new narrative segment 158 such that objects 106 added to the field-of-view 104 of the at least one optical sensor 102 during a preceding narrative segment 152a may alter or change a subsequent narrative segment 152b.

If the adaptive narrative presentation circuit 112 fails to detect a new object 106 in the field-of-view 104 of the at least one optical sensor 106, at 310 the adaptive narrative presentation circuit 112 outputs the unmodified narrative segment 158 at the communications interface 120. If the adaptive narrative presentation circuit 112 detects a new object 106 in the field-of-view 104 of the at least one optical sensor 106, method 300 proceeds at 312.

At 312, the adaptive narrative presentation circuit 112 determines one or more aspects 154 of the narrative presentation 150 that are logically associated with the identified new object 106 added to the field-of-view 104 of the at least one optical sensor 102. In embodiments, the adaptive narrative presentation circuit 112 may determine the one or more aspects 154 by performing one or more look-up actions or one or more similar data retrieval actions using data retained or otherwise stored in one or more data stores 134. In embodiments, the adaptive narrative presentation circuit 112 may determine the newly added object is logically related to a plurality of aspects 154 of the narrative presentation 150. In such embodiments, the adaptive narrative presentation circuit 112 may autonomously select at least one of the aspects 154 of the narrative presentation 150 for alteration or modification based on the object 106.

At 314, the adaptive narrative presentation circuit 112 modifies at least one aspect 154 of the narrative presentation 150 based on the identified object 106 added to the field-of-view 104 of the at least one optical sensor 102. For example, the adaptive narrative presentation circuit 112 may change an aspect 154 such as the perspective presented in the narrative segment 158 from a narrative protagonist to a narrative antagonist responsive to identifying the addition of an object associated with the narrative antagonist to the field-of-view 104 of the at least one optical sensor 102.

In some implementations, the adaptive narrative presentation circuit 112 may modify the narrative presentation 150 by substituting a different narrative segment 158 into the narrative presentation 150. In such an implementation, a narrative segment 158 logically associated with each of at least some of the objects 106 may be stored for retrieval by the adaptive narrative presentation circuit 112.

In an example embodiment, a total of four narrative segments 158c may be stored. The first stored narrative segment 158c may be considered a "default" segment that is outputted by the adaptive narrative presentation circuit 112 if no new objects 106 are added to the field-of-view 104 of the at least one optical sensor 102. The second stored narrative segment 158c may be logically associated with aspect 154a of object 106a and will be substituted by the adaptive narrative presentation circuit 112 if object 106a is added to the field-of-view 104 of the at least one optical sensor 102. The third stored narrative segment 158c may be logically associated with aspect 154b of object 106b and will be substituted by the adaptive narrative presentation circuit 112 if object 106b is added to the field-of-view 104 of the at least one optical sensor 102. The fourth stored narrative segment 158d may be logically associated with aspect 154a of object 106a and will be substituted by the adaptive narrative presentation circuit 112 if object 106a is added to the field-of-view 104 of the at least one optical sensor 102.

At 316, the adaptive narrative presentation circuit 112 may output the modified narrative presentation 150 to the communications interface 120. In some implementations, one or more output devices (display device, audio output device, etc.) may be communicably coupled to the communications interface 120 and the narrative presentation 150 may be outputted in a human-perceptible format by the one or more output devices.

At 318, the adaptive narrative presentation circuit 112 confirms whether the narrative presentation 150 has been completed. If the narrative presentation 150 has not been completed, the adaptive narrative presentation circuit 112 returns to 306 and continues to monitor for the appearance of new objects in the field-of-view 104 of the at least one optical sensor 102. If the narrative presentation has completed, the method 300 concludes at 320.

Figure 4:
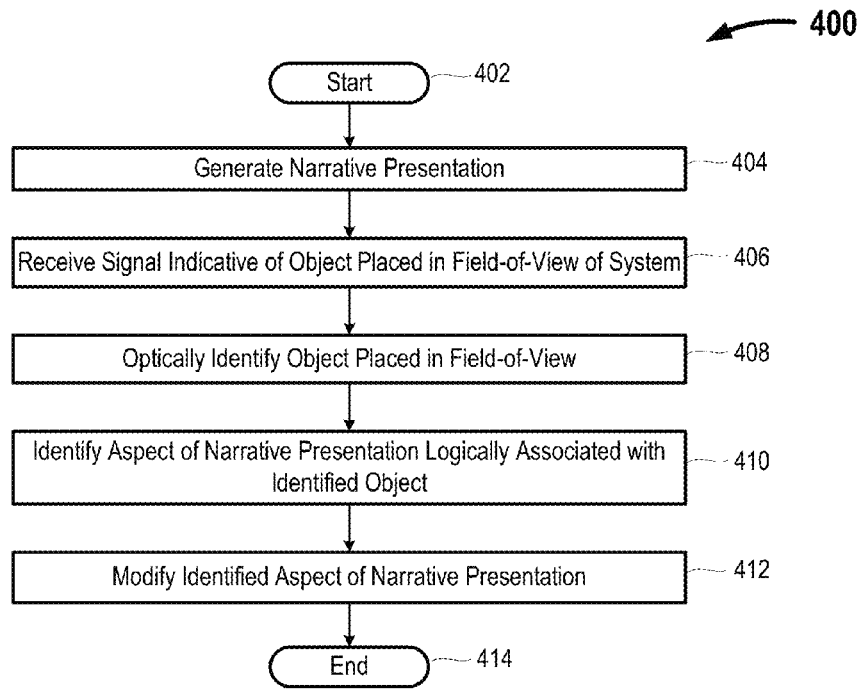
FIG. 4 is a high-level flow diagram of another example method of altering the content of an adaptive narrative presentation in response to detecting the addition of an object to the field-of-view of the system, in accordance with at least one embodiment of the present disclosure.

FIG. 4 is a high-level flow diagram of another illustrative method 400 of changing the content of a narrative presentation 150 responsive to identifying one or more objects 106 added to the field-of-view 104 that are optically identified by an adaptive narrative presentation system 100 over the course of the narrative presentation 150, in accordance with one or more embodiments described herein. The adaptive narrative presentation system 100 includes at least one optical sensor 102 that generates an output signal that includes information indicative of objects 106 appearing within the field-of-view 104 of at least one optical sensor 102 included in the adaptive narrative presentation system 100. A change in the content of the output signal from the at least one optical sensor 102 may therefore indicate the placement or addition of a new object 106 to the field-of-view 104 of the at least one optical sensor 102. In embodiments, the adaptive narrative presentation circuit 112 may use the data in the output signal from the at least one optical sensor 102 as a basis for identifying an object 106 that is added to the field-of-view 104 of the at least one optical sensor 102. Based at least in part on the identity of the newly added object 106, the adaptive narrative presentation circuit 112 may alter or change the content of the narrative presentation 150 to reflect one or more aspects logically associated with the identified object 106. The method 400 commences at 402.

At 404, the adaptive narrative presentation circuit 112 generates a narrative presentation 150. Each narrative presentation 150 may include a number of narrative segments 158, each of which represents a logical portion of the overall narrative presentation 150. In some implementations, each of the narrative segments 158 may be considered analogous to a particular chapter in a book or a particular scene in a movie. Each of the narrative segments 158 may be composed of a number of individual frames 152.

At 406, the adaptive narrative presentation circuit 112 may receive one or more signals from a communicably coupled optical sensor 102. The one or more signals may each include data representative of objects 106 appearing within the field-of-view 104 of the at least one optical sensor 102. In some implementations, the adaptive narrative presentation circuit 112 may compare signals received from the at least one optical sensor 102 at two or more different times to determine whether a new object 106 has been added to or removed from the field-of-view 104 of the at least one optical sensor 102. In some implementations, the adaptive narrative presentation circuit 112 may perform such data comparisons on an ongoing basis such that a new object 106 added to the field-of-view 104 of the at least one optical sensor 102 may be detected virtually immediately upon placement in the field-of-view 104. In some implementations, the adaptive narrative presentation circuit 112 such data comparisons on a periodic basis, for example every 10 seconds. In some implementations, the adaptive narrative presentation circuit 112 may perform such comparisons on an aperiodic basis or even on an event driven basis, for example at the conclusion of each of the narrative segments 158.

At 408, the adaptive narrative presentation circuit 112 may attempt to identify some or all of the objects 106 in the field-of-view 104 of the at least one optical sensor 102. In some implementations, the adaptive narrative presentation circuit 112 may attempt to identify only those objects 106 identified as newly added by the adaptive narrative presentation circuit 112. The adaptive narrative presentation circuit 112 identifies objects 106 in whole or in part using only data in one or more of the visible spectrum, the infrared spectrum, or the ultraviolet spectrum. In some implementations, the adaptive narrative presentation circuit 112 identifies objects 106 based in whole or in part on intrinsic characteristics of the object itself rather than an object such as a 2D or 3D matrix code, bar code, RFID tag, NFC tag or similar carried by the object 106. Examples of such intrinsic characteristics include, but are not limited to: a color on all or a portion of the object, a shape of all or a portion of an object, an anatomical feature of the object, a proportion between two or more portions of the object, a proportion between two or more colors of the object, or combinations thereof.

In at least some implementations, the adaptive narrative presentation circuit 112 may identify an object 106 added to the field-of-view 104 of the at least one optical sensor 102 by performing one or more look-up or other data retrieval operations in one or more data stores 134. For example, the adaptive narrative presentation circuit 112 may use data indicative of color and shape of the object 106 to perform one or more look-up or similar data retrieval operations to identify the object 106. In some embodiments, the method 400 may conclude if the adaptive narrative presentation circuit 112 is unable to identify the object 106 added to the field-of-view 104 of the at least one optical sensor 102.

At 410, the adaptive narrative presentation circuit 112 may identify one or more aspects 154 of the narrative presentation 150 logically associated with the identified object 106. Example aspects 154 of the narrative presentation 150 may include, but are not limited to: a location where the narrative occurs during a portion of the narrative at which the object is identified, a time period during a portion of the narrative at which the object is identified, a weather condition during a portion of the narrative at which the object is identified, a social condition during a portion of the narrative at which the object is identified, or a mood of the narrative during a portion of the narrative at which the object is identified.

In at least some implementations, the adaptive narrative presentation circuit 112 may identify the aspects 154 with which the identified object 106 is logically associated by performing one or more look-up or other data retrieval operations in one or more data stores 134. For example, the adaptive narrative presentation circuit 112 may identify the newly added object 106 as a three-dimensional representation of a transit bus. Responsive to the identification of the object 106 as a transit bus, the adaptive narrative presentation circuit 112 may alter, adjust or change one or more aspects 154 of the narrative presentation 150 to reflect an event occurring on a transit bus or similar public transportation.

At 412, the adaptive narrative presentation circuit 112 modifies at least one aspect 154 of the narrative presentation 150 based on the identified object 106 added to the field-of-view 104 of the at least one optical sensor 102 at 406. For example, the adaptive narrative presentation circuit 112 may change an aspect 154 such as the perspective presented in the narrative segment 158 from a narrative protagonist to a narrative antagonist responsive to identifying the addition of an object 106 logically associated with the antagonist to the field-of-view 104 of the at least one optical sensor 102.

In some implementations, the adaptive narrative presentation circuit 112 may modify the narrative presentation 150 by substituting a different narrative segment 158 into the narrative presentation 150. In such an implementation, a narrative segment 158 logically associated with each of at least some of the objects 106 may be stored for retrieval by the adaptive narrative presentation circuit 112. The method 400 concludes at 414.

Figure 5:
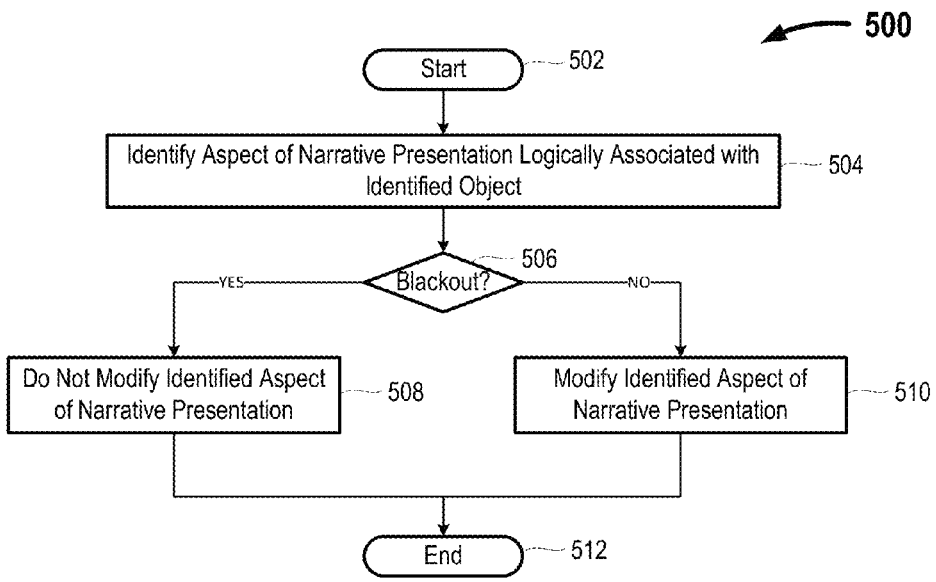
FIG. 5 is a high-level flow diagram of an example method of preventing the adaptive narration presentation system from changing the content of a narrative presentation during a designated "blackout" narrative segment, in accordance with at least one embodiment of the present disclosure.

FIG. 5 is a high-level flow diagram of an illustrative method 500 of preventing the adaptive narration presentation system 100 from changing the content of a narrative presentation 150 during a designated "blackout" narrative segment 156, in accordance with one or more embodiments described herein. Various segments 158 of a narrative presentation 150 may be designated as a "blackout" narrative segment 156 during which the adaptive narrative presentation circuit 112 may alter only limited aspects 154 or may be unable to alter any aspects 154 of the narrative presentation 150. In embodiments, such "blackout" narrative segments 156 may provide information critical to the plot development within the narrative presentation 150 and therefore may be insulated from alteration by the adaptive narrative presentation circuit 112. In embodiments, the creator or editor of the narrative presentation 150 may designate such "blackout" narrative segments 156 to preserve the artistic integrity of the narrative presentation 150. The adaptive narrative presentation system 100 provides the capability to limit or even preclude changes to the narrative presentation 150 by the adaptive narrative presentation circuit 112 during such "blackout" narrative segments 156. The method 500 commences at 502.

At 504, the adaptive narrative presentation circuit 112 identifies an aspect 154 of the narrative presentation 150 logically associated with an object 106 added to the field-of-view 104 of the at least one optical sensor 102. In at least some implementations, the adaptive narrative presentation circuit 112 may use one or more look-up tables or similar data retrieval systems in conjunction with one or more data stores 134 to identify the aspects 154 logically related to the newly added object 106.

At 506, the adaptive narrative presentation circuit 112 determines whether the narrative segment 158 is designated a "blackout" narrative segment 156. In some embodiments, information indicative of whether a particular narrative segment 158 is a designated "blackout" narrative segment 156 may be stored in one or more data stores 134. In other embodiments, information indicative of whether a particular narrative segment 158 is a designated "blackout" narrative segment 156 may be included in metadata or similar data included with the narrative presentation 150 itself.

If the narrative segment 158 is a designated "blackout" narrative segment 156, at 508 the adaptive narrative presentation circuit 112 may fail to change, modify, or alter the narrative presentation 150 and may instead display the unchanged, unmodified, or unaltered narrative presentation 150. In some implementations, the adaptive narrative presentation circuit 112 may provide an indicator to the system user that the object 106 added to the field-of-view 104 of the at least one optical sensor 102 has been detected, but that changes to the narrative presentation 150 are currently not possible.

If the narrative segment 158 is not a designated "blackout" narrative segment 156, at 510 the adaptive narrative presentation circuit 112 changes, modifies, or alters the aspect 154 of the narrative presentation 150 that is logically associated with the object 106 added to the field-of-view 104 of the at least one optical sensor 102. The method 500 concludes at 512.

Figure 6:
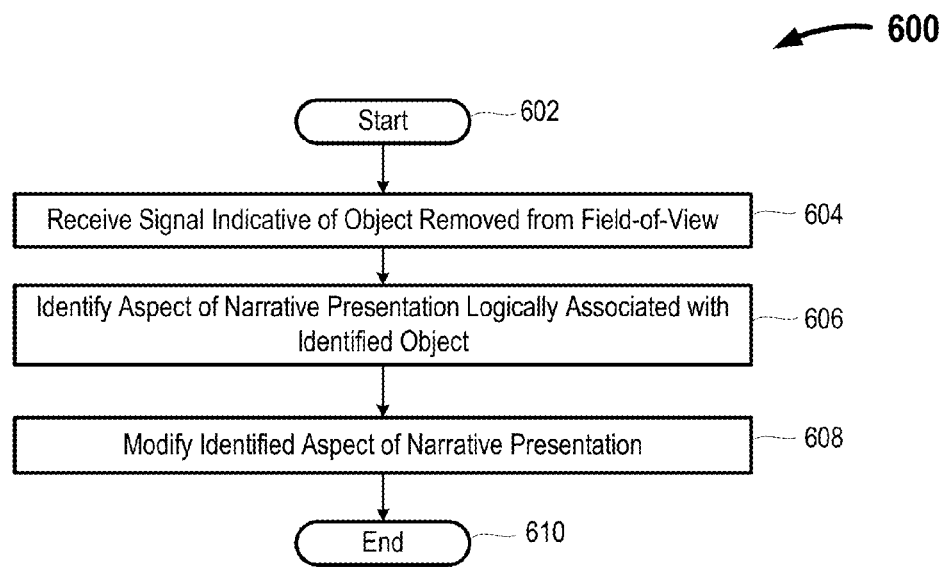
FIG. 6 is a high-level flow diagram of an example method for altering the content of an adaptive narrative presentation in response to detecting the removal of an identified object from the field-of-view of the system, in accordance with at least one embodiment of the present disclosure.

FIG. 6 is a high-level flow diagram of an example method 600 for altering the content of an adaptive narrative presentation 150 in response to detecting the removal of an identified object 106 from the field-of-view 104 of the adaptive narrative presentation system 100, in accordance with one or more embodiments described herein. The adaptive narrative presentation system 100 detects and identifies objects 106 that placed within the field-of-view 104 of the at least one optical sensor 102. In embodiments, the adaptive narrative presentation system 100 may maintain an ongoing inventory of identified objects 106 within the field-of-view 104 of the at least one optical sensor 102. Such an inventory may be used by the adaptive narrative presentation circuit 112 to determine when a new object appears in the field-of-view 104 of the at least one optical sensor 102. Where the adaptive narrative presentation circuit 112 maintains such an object inventory, the adaptive narrative presentation circuit 112 may change, modify, or alter one or more aspects 154 of the narrative presentation 150 responsive to detecting the removal of an identified object 106 from the field-of-view 104 of the at least one optical sensor 102. The method 600 commences at 602.

At 604, the adaptive narrative presentation circuit 112 receives one or more signals from the at least one optical sensors 102. The one or more signals may contain or otherwise include data indicative of the objects 106 appearing within the field-of-view 104 of the at least one optical sensor 102. Using the object data contained in the one or more signals received from the at least one optical sensor 102, the adaptive narrative presentation circuit 112 may determine when a previously identified object 106 has been removed from the field-of-view 104 of the at least one optical sensor 102.

At 606, the adaptive narrative presentation circuit 112 identifies at least one aspect 154 of the narrative presentation 150 logically associated with the previously identified object 106 removed from the field-of-view 104 of the at least one optical sensor 102.

At 608, the adaptive narrative presentation circuit 112 modifies the aspect 154 of the narrative presentation 150 that is logically associated with the previously identified object 106 removed from the field-of-view 104 of the at least one optical sensor 102. The method 600 concludes at 610.

The following examples pertain to embodiments that employ some or all of the described adaptive narrative presentation systems, methods, and storage devices described herein. The enclosed examples should not be considered exhaustive, nor should the enclosed examples be construed to exclude other combinations of the systems, methods, and apparatuses disclosed herein but which are not specifically enumerated herein.

According to example 1 there is provided adaptive narrative presentation system. The system may include at least one optical sensor having a field-of-view and a communications interface. The system may further include an adaptive narrative presentation circuit communicably coupled to the at least one optical sensor and the communications interface. The adaptive narration presentation circuit may generate a narrative presentation output at the communications interface and optically identify an object added to the field-of-view of the at least one optical sensor, the optical identification based at least in part on at least one intrinsic parameter of the object. The adaptive narration presentation circuit may further identify at least one aspect of the narrative presentation associated with the identified object and modify the at least one aspect of the narrative presentation based at least in part on the identified object.

Example 2 may include elements of example 1 where the adaptive narrative presentation circuit may further identify at least one aspect of the narrative presentation associated with the identified object including one or more of: a plot of the narrative, a setting of the narrative, an atmosphere of the narrative, a character in the narrative, a theme occurring in the narrative, or a point of view in the narrative.

Example 3 may include elements of example 2 where the adaptive narrative presentation circuit may further identify at least one of: a location where the narrative occurs during a portion of the narrative at which the object is identified, a time period during a portion of the narrative at which the object is identified, a weather condition during a portion of the narrative at which the object is identified, a social condition during a portion of the narrative at which the object is identified, or a mood of the narrative during a portion of the narrative at which the object is identified.

Example 4 may include the elements of example 1 where the adaptive narrative presentation circuit may further generate an audio/visual narrative presentation output at the communications interface.

Example 5 may include elements of example 1 and may further include a storage device that contains a data store that includes data indicative of intrinsic parameters associated with each of a number of objects.

Example 6 may include elements of example 5 where the adaptive narrative presentation circuit may further optically identify the object based at least in part on at least one intrinsic parameter of the object including at least one of: a shape of the object, a color of the object, a proportion of the object, or an anatomical feature of the object.

Example 7 may include elements of example 1 and may further include a storage device communicably coupled to the adaptive narrative presentation circuit, the storage device including a data store that includes data indicative of objects identifiable by the adaptive narration presentation circuit and one or more respective aspects of the narrative associated with each of the object identifiable by the adaptive narration presentation circuit.

Example 8 may include elements of example 1 where the adaptive narrative presentation circuit may further identify a number of permissible aspect changes in the narrative presentation responsive to successfully identifying the object; and may further autonomously select one of the number of permissible aspect changes in the narrative presentation based at least in part on the at least one aspect of the narrative presentation associated with the identified object.

Example 9 may include elements of example 1 and may additionally include at least one output device communicably coupled to the communications interface.

Example 10 may include elements of any of examples 1 through 9 the adaptive narrative presentation circuit may further, concurrent with the narrative presentation, optically identify an object removed from the field-of-view of the at least one optical sensor, the optical identification based at least in part on at least one intrinsic parameter of the object, identify at least one aspect of the narrative presentation associated with the identified object removed from the field-of-view of the at least one optical sensor, and autonomously modify the at least one aspect of the narrative presentation based at least in part on the identified object removed from the field-of-view of the at least one optical sensor.

Example 11 may include elements of any of examples 1 through 9 where the at least one optical sensor may include at least one optical sensor that provides one or more signals including red/green/blue (RGB) information and depth information from the field-of-view of the at least one optical sensor and the adaptive narrative presentation circuit may further identify the object added to the field-of-view of the at least one optical sensor using at least one of the RGB information or the depth information from the field-of-view of the at least one optical sensor.

According to example 12 there is provided an adaptive narrative presentation method. The method may include generating, by an adaptive narration presentation circuit, a narrative presentation output at a communicably coupled communications interface. The method may additionally include receiving, by the adaptive narration presentation circuit, a signal containing data indicative of an object placed in a field-of-view of at least one optical sensor communicably coupled to the adaptive narrative presentation circuit. The method may further include concurrent with the narrative presentation, optically identifying, by the adaptive narration presentation circuit, the object based at least in part on at least one intrinsic characteristic of the object. The method may also include autonomously identifying, by the adaptive narration presentation circuit, at least one aspect of the narrative presentation associated with the identified object and modifying, by the adaptive narration presentation controller, the at least one aspect of the narrative presentation based at least in part on the identified object.

Example 13 may include elements of example 12 where autonomously identifying at least one aspect of the narrative presentation associated with the identified object may further include autonomously identifying, by the adaptive narration presentation circuit, at least one aspect of the narrative presentation associated with the identified object including one or more of: a plot of the narrative, a setting of the narrative, an atmosphere of the narrative, a character in the narrative, a theme occurring in the narrative, or a point of view in the narrative.

Example 14 may include elements example 13 where autonomously identifying at least one aspect of the narrative presentation associated with the identified object including a setting of the narrative may further include identifying at least one of: a location where the narrative occurs during a portion of the narrative at which the object is identified, a time period during a portion of the narrative at which the object is identified, a weather condition during a portion of the narrative at which the object is identified, a social condition during a portion of the narrative at which the object is identified, or a mood of the narrative during a portion of the narrative at which the object is identified.

Example 15 may include elements of example 12 where generating a narrative presentation output at a communicably coupled communications interface may further include generating an audio/visual narrative presentation output at the communications interface.

Example 16 may include elements of example 12 where optically identifying, by the adaptive narrative presentation circuit, the object based at least in part on at least one intrinsic characteristic of the object may further include optically identifying the object based at least in part on at least one intrinsic characteristic including at least one of: a characteristic shape of the object, a characteristic color of the object, a characteristic proportion of the object, or a characteristic anatomical feature of the object.

Example 17 may include elements of example 12 and may additionally include identifying, by the adaptive narrative presentation circuit, a number of permissible aspect changes in the narrative presentation upon identification of the object and autonomously selecting, by the adaptive narrative presentation circuit, one of the number of permissible aspect changes in the narrative presentation based at least in part on the at least one aspect of the narrative presentation associated with the identified object.

Example 18 may include the elements of any of examples 12 through 17 and may further include, concurrent with the narrative presentation, optically identifying, by the adaptive narrative presentation circuit, an object removed from the field-of-view of the optical sensor, the optical identification based at least in part on at least one intrinsic parameter of the object, identifying, by the adaptive narrative presentation circuit, at least one aspect of the narrative presentation associated with the identified object removed from the field-of-view of the optical sensor, and modifying, by the adaptive narrative presentation circuit, the at least one aspect of the narrative presentation based at least in part on the identified object.

Example 19 may include elements of any of examples 12 through 17 where receiving a signal containing data indicative of an object placed in a field-of-view of at least one optical sensor communicably coupled to the adaptive narrative presentation circuit may include receiving a signal containing data including at least one of: data representative of the red/green/blue (RGB) levels of the field-of-view of the at least one optical sensor or data representative of the depth to objects located in the field-of-view of the at least one optical sensor.

According to example 20, there is provided an adaptive narrative presentation system. The system may include a means for generating a narrative presentation output at a communicably coupled communications interface and a means for receiving a signal containing data indicative of an object placed in a field-of-view of a communicably coupled optical sensor. The system may further include a means for optically identifying concurrent with the narrative presentation the object based at least in part on at least one intrinsic parameter of the object. The system may additionally include a means for autonomously identifying at least one aspect of the narrative presentation associated with the identified object and a means for modifying the at least one aspect of the narrative presentation based at least in part on the identified object.

Example 21 may include elements of example 20 where the means for autonomously identifying at least one aspect of the narrative presentation associated with the identified object may include a means for autonomously identifying at least one aspect of the narrative presentation associated with the identified object including one or more of: a plot of the narrative, a setting of the narrative, an atmosphere of the narrative, a character in the narrative, a theme occurring in the narrative, or a point of view in the narrative.

Example 22 may include elements of example 21 where the means for autonomously identifying at least one aspect of the narrative presentation associated with the identified object including a setting of the narrative may further include a means for identifying at least one of: a location where the narrative occurs during a portion of the narrative at which the object is identified, a time period during a portion of the narrative at which the object is identified, a weather condition during a portion of the narrative at which the object is identified, a social condition during a portion of the narrative at which the object is identified, or a mood of the narrative during a portion of the narrative at which the object is identified.

Example 23 may include elements example 22 where the means for generating a narrative presentation output at a communicably coupled communications interface may further include a means for generating an audio/visual narrative presentation output at the communications interface.

Example 24 may include elements of example 20 where optically identifying the object based at least in part on at least one intrinsic parameter of the object may further include a means for optically identifying the object based at least in part on at least one intrinsic parameter of the object including at least one of: a shape of the object, a color of the object, a proportion of the object, or an anatomical feature of the object.

Example 25 may include elements of example 20 and may additionally include a means for identifying a number of permissible aspect changes in the narrative presentation responsive to a successful identification of the object and a means for autonomously selecting one of the number of permissible aspect changes in the narrative presentation based at least in part on the at least one aspect of the narrative presentation associated with the identified object.

Example 26 may include elements of any of examples 20 through 25 and may further include a means for concurrent with the narrative presentation, optically identifying an object removed from the field-of-view of the optical sensor, the optical identification based at least in part on at least one intrinsic parameter of the object, a means for identifying at least one aspect of the narrative presentation associated with the identified object removed from the field-of-view of the optical sensor, and a means for modifying the at least one identified aspect of the narrative presentation based at least in part on the removal of the identified object.

According to example 27, there is provided a storage device that includes machine-readable instructions that, when executed, cause a circuit to provide an adaptive narrative presentation circuit. The machine-readable instructions may cause the circuit to generate a narrative presentation output at a communicably coupled communications interface. The machine-readable instructions may cause the circuit to receive a signal containing data indicative of an object placed in a field-of-view of at least one communicably coupled optical sensor and concurrent with the generation of the narrative presentation, optically identify the object based at least in part on at least one intrinsic characteristic of the object. The machine-readable instructions may cause the circuit to autonomously identify at least one aspect of the narrative presentation associated with the identified object and modify the at least one aspect of the narrative presentation based at least in part on the identified object.

Example 28 may include elements of example 27 where the machine-readable instructions that cause the circuit to autonomously identify at least one aspect of the narrative presentation associated with the identified object may further cause the circuit to autonomously identify at least one aspect of the narrative presentation associated with the identified object including one or more of: a plot of the narrative, a setting of the narrative, an atmosphere of the narrative, a character in the narrative, a theme occurring in the narrative, or a point of view in the narrative.

Example 29 may include elements of example 28 where the machine-readable instructions that cause the circuit to autonomously identify at least one aspect of the narrative presentation associated with the identified object including a setting of the narrative may further cause the circuit to identify at least one of: a location where the narrative occurs during a portion of the narrative at which the object is identified, a time period during a portion of the narrative at which the object is identified, a weather condition during a portion of the narrative at which the object is identified, a social condition during a portion of the narrative at which the object is identified, or a mood of the narrative during a portion of the narrative at which the object is identified.

Example 30 may include elements of example 27 where the machine-readable instructions that cause the circuit to generate a narrative presentation output at a communicably coupled communications interface may further cause the circuit to generate an audio/visual narrative presentation output at the communications interface.

Example 31 may include elements of example 27 where the machine-readable instructions that cause the circuit to optically identify the object based at least in part on at least one intrinsic characteristic of the object may further cause the circuit to optically identify the object based at least in part on at least one intrinsic characteristic including at least one of: a characteristic shape of the object, a characteristic color of the object, a characteristic proportion of the object, or a characteristic anatomical feature of the object.

Example 32 may include elements of example 27 where the machine-readable instructions may further include instructions that, when executed, cause the circuit to identify a number of permissible aspect changes in the narrative presentation upon identification of the object and autonomously select one of the number of permissible aspect changes in the narrative presentation based at least in part on the at least one aspect of the narrative presentation associated with the identified object.

Example 33 may include elements of example 27 where the machine-readable instructions may further comprise instructions that, when executed, cause the circuit to, concurrent with the narrative presentation, optically identify an object removed from the field-of-view of the at least one optical sensor, the optical identification based at least in part on at least one intrinsic parameter of the object, identify at least one aspect of the narrative presentation logically associated with the identified object removed from the field-of-view of the at least one optical sensor, and modify the at least one aspect of the narrative presentation based at least in part on the identified object.

According to example 34, there is provided a system for providing an adaptive narrative presentation including at least a device, the system being arranged to perform the method of any of examples 12 through 19.

According to example 35, there is provided a chipset arranged to perform the method of any of examples 12 through 19.

According to example 36, there is provided at least one machine readable medium comprising a plurality of instructions that, in response to be being executed on a computing device, cause the computing device to carry out the method according to any of examples 12 through 19.

According to example 37, there is provided a device configured for providing an adaptive narrative presentation, the device being arranged to perform the method of any of examples 12 through 19.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. An adaptive narrative presentation system, comprising:
   at least one optical sensor having a field-of-view;
   a communications interface; and
   an adaptive narration presentation circuit communicably coupled to the at least one optical sensor and the communications interface, the adaptive narration presentation circuit to:
   generate a narrative presentation output at the communications interface;
   optically identify an object added to the field-of-view of the at least one optical sensor, the optical identification based at least in part on at least one intrinsic parameter of the object;
   identify at least one aspect of the narrative presentation associated with the identified object; and
   modify the at least one aspect of the narrative presentation based at least in part on the identified object.

2. The system of claim 1, the adaptive narration presentation circuit to further:
   identify at least one aspect of the narrative presentation associated with the identified object including one or more of: a plot of the narrative, a setting of the narrative, an atmosphere of the narrative, a character in the narrative, a theme occurring in the narrative, or a point of view in the narrative.

3. The system of claim 2, the adaptive narration presentation circuit to further:
   identify at least one of: a location where the narrative occurs during a portion of the narrative at which the object is identified, a time period during a portion of the narrative at which the object is identified, a weather condition during a portion of the narrative at which the object is identified, a social condition during a portion of the narrative at which the object is identified, or a mood of the narrative during a portion of the narrative at which the object is identified.

4. The system of claim 1, the adaptive narration presentation circuit to further:
   generate an audio/visual narrative presentation output at the communications interface.

5. The system of claim 1, further comprising a storage device communicably coupled to the adaptive narrative presentation circuit, the storage device including:
   a data store that includes data indicative of intrinsic parameters logically associated with each of a number of objects.

6. The system of claim 5 the adaptive narration presentation circuit to further:
   optically identify the object based at least in part on at least one intrinsic parameter of the object including at least one of: a shape of the object, a color of the object, a proportion of the object, or an anatomical feature of the object.

7. The system of claim 1, further comprising a storage device communicably coupled to the adaptive narrative presentation circuit, the storage device including:
   a data store that includes data indicative of objects identifiable by the adaptive narration presentation circuit and one or more respective aspects of the narrative associated with each of the object identifiable by the adaptive narration presentation controller.

8. The system of claim 1 the adaptive narration presentation circuit to further:

identify a number of permissible aspect changes in the narrative presentation responsive to successfully identifying the object; and autonomously select one of the number of permissible aspect changes in the narrative presentation based at least in part on the at least one aspect of the narrative presentation logically associated with the identified object.

9. The system of claim 1 further comprising:
at least one output device communicably coupled to the communications interface.

10. The system of claim 1 the adaptive narration presentation circuit to further:
optically identify an object removed from the field-of-view of the at least one optical sensor, the optical identification based at least in part on at least one intrinsic parameter of the object;
identify at least one aspect of the narrative presentation logically associated with the identified object removed from the field-of-view of the at least one optical sensor; and
autonomously modify the at least one aspect of the narrative presentation based at least in part on the identified object removed from the field-of-view of the at least one optical sensor.

11. The system of claim 1 wherein the at least one optical sensor comprises:
at least one optical sensor that provides one or more signals including red/green/blue (RGB) information and depth information from the field-of-view of the at least one optical sensor; and
the adaptive narration presentation circuit to further:
identify the object added to the field-of-view of the at least one optical sensor using at least one of the RGB information or the depth information from the field-of-view of the at least one optical sensor.

12. An interactive adaptive narrative presentation method, comprising:
generating, by an adaptive narration presentation circuit, a narrative presentation output at a communicably coupled communications interface;
receiving, by the adaptive narration presentation circuit, a signal containing data indicative of an object placed in a field-of-view of at least one optical sensor communicably coupled to the adaptive narrative presentation system;
concurrent with the narrative presentation, optically identifying, by the adaptive narration presentation circuit, the object based at least in part on at least one intrinsic characteristic of the object;
autonomously identifying, by the adaptive narration presentation circuit, at least one aspect of the narrative presentation associated with the identified object; and
modifying, by the adaptive narration presentation circuit, the at least one aspect of the narrative presentation based at least in part on the identified object.

13. The method of claim 12 wherein autonomously identifying at least one aspect of the narrative presentation associated with the identified object further comprises:
autonomously identifying, by the adaptive narration presentation circuit, at least one aspect of the narrative presentation associated with the identified object including one or more of: a plot of the narrative, a setting of the narrative, an atmosphere of the narrative, a character in the narrative, a theme occurring in the narrative, or a point of view in the narrative.

14. The method of claim 13 wherein autonomously identifying at least one aspect of the narrative presentation associated with the identified object including a setting of the narrative further comprises:
identifying at least one of: a location where the narrative occurs during a portion of the narrative at which the object is identified, a time period during a portion of the narrative at which the object is identified, a weather condition during a portion of the narrative at which the object is identified, a social condition during a portion of the narrative at which the object is identified, or a mood of the narrative during a portion of the narrative at which the object is identified.

15. The method of claim 12 wherein generating a narrative presentation output at a communicably coupled communications interface further comprises:
generating a narrative presentation audio/visual output at the communications interface.

16. The method of claim 12 wherein optically identifying the object based at least in part on at least one intrinsic characteristic of the object further comprises:
optically identifying the object based at least in part on at least one intrinsic characteristic including at least one of: a characteristic shape of the object, a characteristic color of the object, a characteristic proportion of the object, or a characteristic anatomical feature of the object.

17. The method of claim 12, further comprising:
identifying, by the adaptive narrative presentation circuit, a number of permissible aspect changes in the narrative presentation upon identification of the object; and
autonomously selecting, by the adaptive narrative presentation circuit, one of the number of permissible aspect changes in the narrative presentation based at least in part on the at least one aspect of the narrative presentation associated with the identified object.

18. The method of claim 12, further comprising:
concurrent with the narrative presentation, optically identifying, by the adaptive narrative presentation circuit, an object removed from the field-of-view of the optical sensor, the optical identification based at least in part on at least one intrinsic parameter of the object;
identifying, by the adaptive narrative presentation circuit, at least one aspect of the narrative presentation associated with the identified object removed from the field-of-view of the optical sensor; and
modifying, by the adaptive narrative presentation circuit, the at least one aspect of the narrative presentation based at least in part on the identified object.

19. The method of claim 12 wherein receiving a signal containing data indicative of an object placed in a field-of-view of at least one optical sensor communicably coupled to the adaptive narrative presentation system comprises:
receiving a signal containing data including at least one of: data representative of the red/green/blue (RGB) levels of the field-of-view of the at least one optical sensor or data representative of the depth to objects located in the field-of-view of the at least one optical sensor.

20. An interactive adaptive narrative presentation system, comprising:
a means for generating a narrative presentation output at a communicably coupled communications interface;
a means for receiving a signal containing data indicative of an object placed in a field-of-view of a communicably coupled optical sensor;

a means for optically identifying concurrent with the narrative presentation the object based at least in part on at least one intrinsic parameter of the object;

a means for autonomously identifying at least one aspect of the narrative presentation associated with the identified object; and a means for modifying the at least one aspect of the narrative presentation based at least in part on the identified object.

21. The system of claim 20 wherein the means for autonomously identifying at least one aspect of the narrative presentation associated with the identified object further comprises:

a means for autonomously identifying at least one aspect of the narrative presentation associated with the identified object including one or more of: a plot of the narrative, a setting of the narrative, an atmosphere of the narrative, a character in the narrative, a theme occurring in the narrative, or a point of view in the narrative.

22. The system of claim 21 wherein the means for autonomously identifying at least one aspect of the narrative presentation associated with the identified object including a setting of the narrative further comprises:

a means for identifying at least one of: a location where the narrative occurs during a portion of the narrative at which the object is identified, a time period during a portion of the narrative at which the object is identified, a weather condition during a portion of the narrative at which the object is identified, a social condition during a portion of the narrative at which the object is identified, or a mood of the narrative during a portion of the narrative at which the object is identified.

23. A storage device that includes machine-readable instructions that, when executed by an adaptive narrative presentation circuit, cause the adaptive narrative presentation circuit to:

generate a narrative presentation output at a communicably coupled communications interface;

receive a signal containing data indicative of an object placed in a field-of-view of at least one communicably coupled optical sensor;

concurrent with the generation of the narrative presentation, optically identify the object based at least in part on at least one intrinsic characteristic of the object;

autonomously identify at least one aspect of the narrative presentation associated with the identified object; and modify the at least one aspect of the narrative presentation based at least in part on the identified object.

24. The storage device of claim 23 wherein the machine-readable instructions that cause the adaptive narrative presentation circuit to autonomously identify at least one aspect of the narrative presentation logically associated with the identified object further cause the adaptive narrative presentation circuit to:

autonomously identify at least one aspect of the narrative presentation associated with the identified object including one or more of: a plot of the narrative, a setting of the narrative, an atmosphere of the narrative, a character in the narrative, a theme occurring in the narrative, or a point of view in the narrative.

25. The storage device of claim 24 wherein the machine-readable instructions that cause the adaptive narrative presentation circuit to autonomously identify at least one aspect of the narrative presentation associated with the identified object including a setting of the narrative further cause the adaptive narrative presentation circuit to:

identify at least one of: a location where the narrative occurs during a portion of the narrative at which the object is identified, a time period during a portion of the narrative at which the object is identified, a weather condition during a portion of the narrative at which the object is identified, a social condition during a portion of the narrative at which the object is identified, or a mood of the narrative during a portion of the narrative at which the object is identified.

* * * * *